Dec. 30, 1930.          C. G. McLEAN          1,787,388
LIGHT REFLECTING DEVICE
Filed Feb. 2, 1928          2 Sheets-Sheet 1
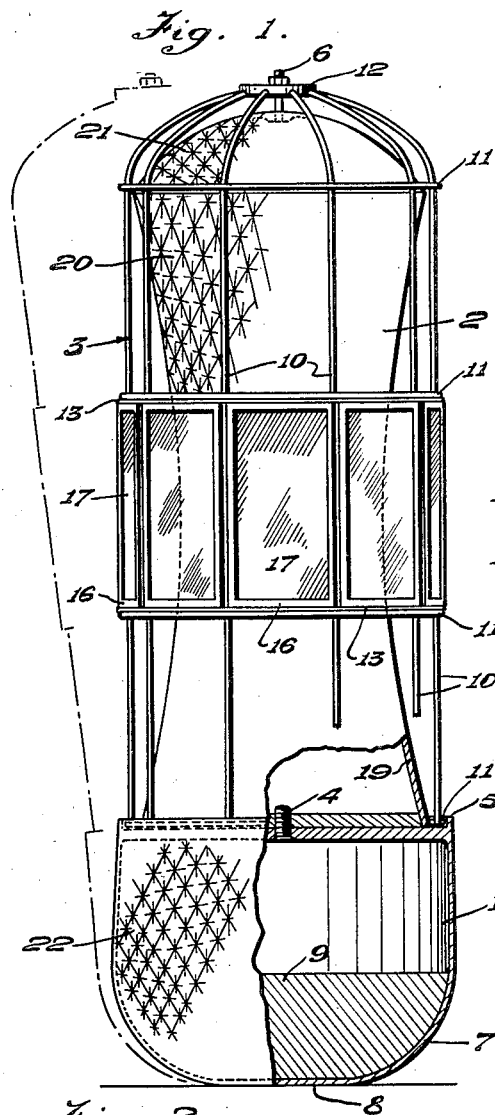
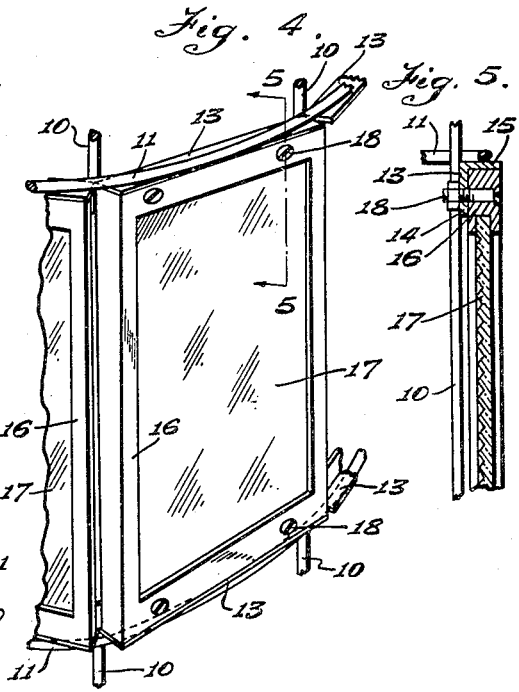
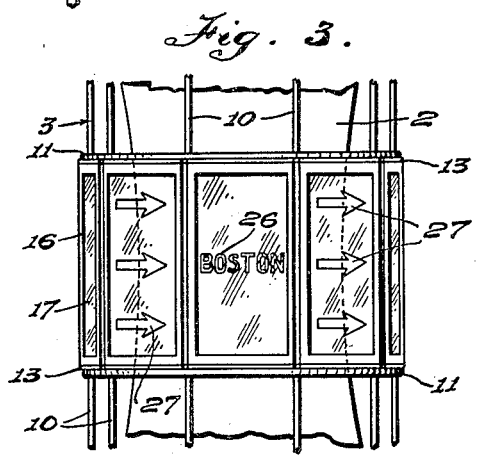
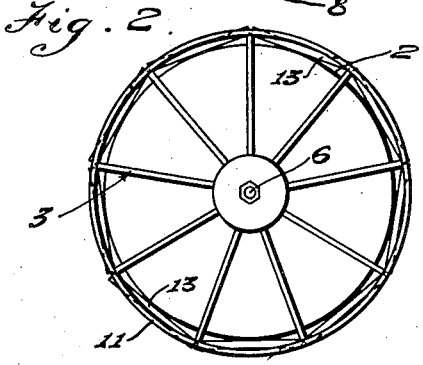
Inventor
CLARENCE GARFIELD McLEAN
By
Attorney Dec. 30, 1930. C. G. McLEAN 1,787,388
LIGHT REFLECTING DEVICE
Filed Feb. 2, 1928 2 Sheets-Sheet 2
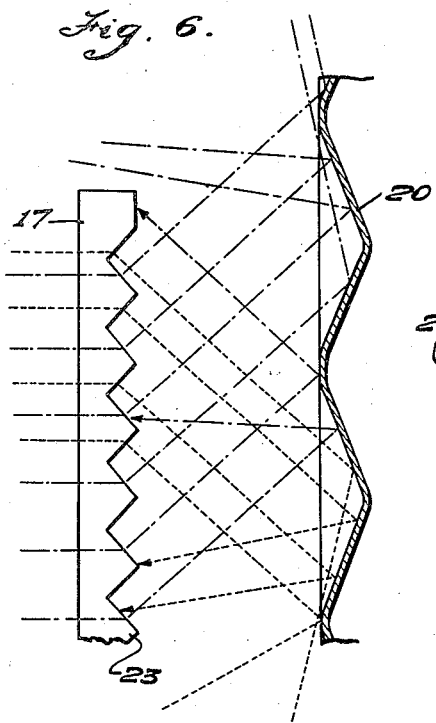
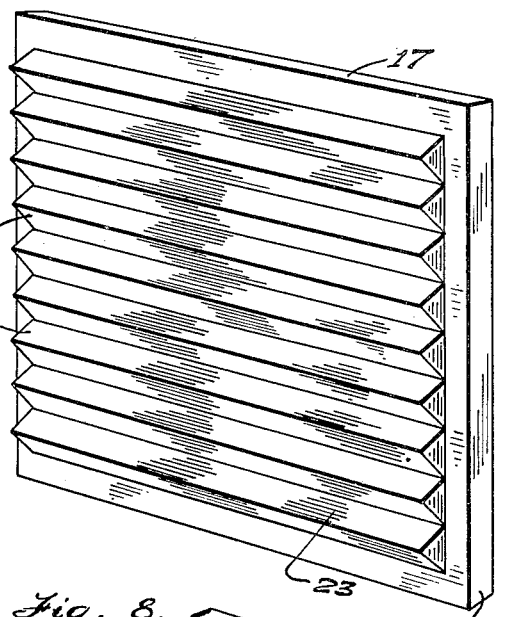
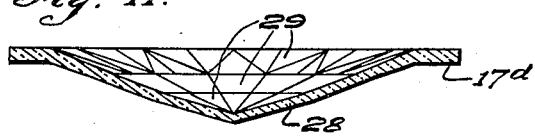
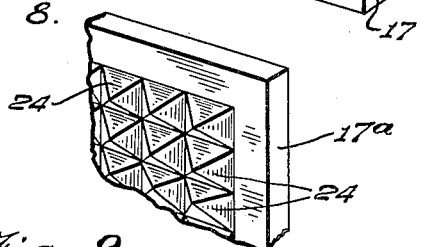
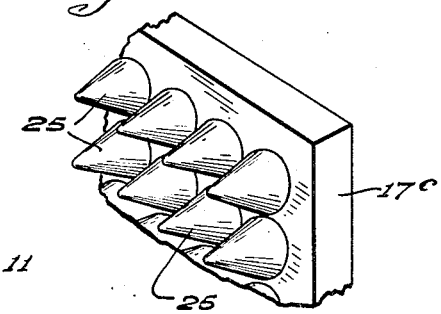
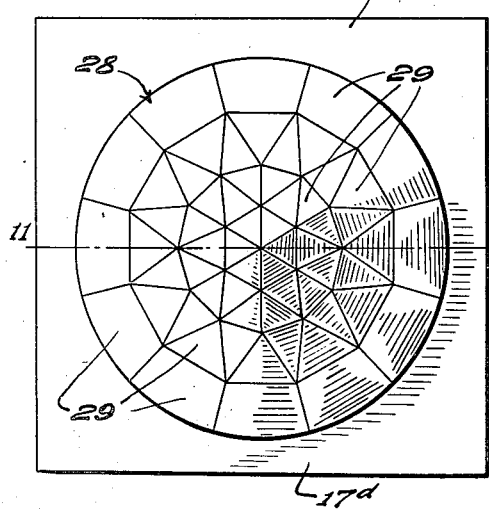
Inventor
CLARENCE GARFIELD McLEAN
By
Attorney Patented Dec. 30, 1930

1,787,388

UNITED STATES PATENT OFFICE

CLARENCE GARFIELD McLEAN, OF BOSTON, MASSACHUSETTS

LIGHT-REFLECTING DEVICE

Application filed February 2, 1928. Serial No. 251,363.

The present invention relates to improvements in signals, signs, indicators and analogous devices of the class which are rendered luminous and hence distinguishable, readable or observable, particularly at night, by light projected from an extraneous source. The invention is more particularly applicable to signals or indicators of the kind adapted to be placed at highway intersections or at dangerous or other points along highways to warn the operators of motor or other vehicles approaching them or to give such operators directions or other appropriate information.

A primary object of the invention is to provide a novel and improved device of this class wherein the device as a whole and also a medium which may be used to color the light reflected therefrom or to display signal or direction symbols or indications or reading matter are rendered highly luminous and thus clearly visible to the vehicle operator by the light projected on to the device by the vehicle headlights while the vehicle approaches the device from any angle, the vehicle operator being thus informed with certainty of the presence of the signal or warning device while approaching it from any direction and while at a considerable distance from it and the operator being enabled to easily discern such direction or warning indications or other symbols or to read such other matter as may be borne by the device.

Another object is to provide a device of this class which when placed at the top or bottom of a hill, is capable of reflecting light from the headlights of a vehicle ascending or descending the hill back to the operator of such vehicle, so that the device can be clearly visible to the operator and the indicating means or other matter thereon may be easily interpreted or read by such operator.

Another object is to provide a device of this class which will be so illuminated by the headlights of a vehicle approaching it from one direction and will so reflect light therefrom as to give a warning of the approach of such vehicle to the operator of another vehicle approaching the device at another angle.

Another object is to provide a device of this class which enables signal, indicating or warning symbols or any appropriate reading matter to be placed thereon so that it will be rendered highly luminous and clearly visible to the operator of an approaching vehicle with illuminated headlights, the device comprising preferably a center reflector and a surrounding cage or frame suitable for the interchangeable mounting thereon of panels bearing any desired indications, signals, symbols or reading matter, and the exterior cage or frame will serve as a guard to protect the reflector from damage due to collision or other causes.

Another object is to provide a warning or signal device of this class whereby the light projected thereon by the headlights from an approaching vehicle are reflected back to the operator of such vehicle so that the device appears as a brilliantly illuminated column or post surrounded by a highly luminous band which is preferably red or of other distinctive color, the band displaying warning or signal indications or reading or other matter which is clearly visible to the vehicle operator.

A further object of the invention is to provide a generally improved structure which embodies light reflecting elements in conjunction with means for protecting such elements against injury due to collision or other causes in conjunction with a supporting base which will normally support the device in upright position but will allow it to tip or tilt over in the event of a collision of a vehicle with it, thus avoiding or minimizing injury to the signal device and the vehicle and its occupants, the signal device being capable of returning automatically to its normal upright position.

To these and other ends the invention consists in certain improvements and combinations and arrangements of parts all as will be hereinafter more fully set forth, the features of novelty being pointed out particularly in the claims at the end of the specification.

In the accompanying drawings:—

Fig. 1 is a side elevation, partly in section, of a warning or signal device constructed in accordance with the present invention;

Fig. 2 is a top plan view of the device as shown in Fig. 1;

Fig. 3 is an elevation of the intermediate portion of the device, showing examples of signal or indicating means that may be applied thereto;

Fig. 4 is a detail view on an enlarged scale of a portion of the exterior cage of the device, showing means for removably and interchangeably mounting therein panels containing different indicating, signal or other matter;

Fig. 5 represents a detail sectional view taken on the line 5—5 of Fig. 4 and looking in the directions of the arrows;

Fig. 6 is a diagrammatic view showing a portion of the central reflecting element and a portion of one of the light transmitting panels in front of it, the dot-and-dot and dash lines indicating the manner in which the light from an extraneous source is diffused by the light transmitting panel and reflected by the reflecting element;

Fig. 7 is a perspective view of one form of light transmitting panel which may be used, it being viewed from the rear side;

Fig. 8 is a perspective view of a portion of another form of light transmitting panel which may be used, the same being viewed from the rear;

Fig. 9 is a perspective view of a portion of another form of light transmitting panel which may be used, it being viewed from the rear side;

Fig. 10 is an exterior or front elevation of a panel which embodies a lens and which may be used in carrying out the invention; and Fig. 11 represents a transverse section taken through the panel shown in Fig. 10 on the line 11—11 in that figure.

Similar parts are designated by the same reference characters in the several figures.

The invention is shown in the present instance as applied to warning or signal devices of the class adapted to be placed at highway intersections or at appropriate points along highways for warning, signal, traffic directing, information and similar purposes, and the preferred embodiments of the invention are shown in the accompanying drawings and will be hereinafter described in detail. It is to be understood however that the invention is applicable to various other uses and may be embodied in various forms, and these will be included within the scope of the claims.

The device as shown comprises a base 1, a central reflector 2 and a surrounding cage or frame 3. The reflector and cage are preferably constructed as separate or separable units, the reflector being secured to the top of the base on which it rests by a screw 4 or other detachable fastening means, and the cage which surrounds the reflector preferably rests at its lower end on top of the base, and may be confined against displacement by a flange 5 which extends upwardly beyond the top of the base and surrounds the lower end of the cage. The top of the cage is removably secured to the top of the reflector by a stud 6 which is secured to and projects upwardly from the top of the reflector and is provided with a clamping nut threaded thereon, as shown.

The bottom of the base 1 is preferably approximately spherical, as at 7 although the center of the bottom is flattened substantially as shown at 8 whereby the device may rest on the surface of a pavement or roadway and it will be normally maintained in upright position by a weight 9 which is contained in the bottom of the base section and is so proportioned to the weight of the remainder of the device that the weight 9 will normally maintain the device in upright position and will return it to such position after being tilted or tipped out of that position. The device is shown in its normal upright position so that it rests on the flattened portion 8 of its bottom section by the full lines in Fig. 1, and the dotted lines in that figure illustrate how the device may be tilted from its normal upright position as the result of a collision of a vehicle therewith. The cage 3 which surrounds the reflector is preferably composed of a suitable number of vertically extending circumferentially spaced rods 10 and a suitable number of ring-like circumferentially extending members 11 which may be welded or otherwise united rigidly with the vertical members, the lowermost circumferential member 11 resting on the top of the base section 1 and fitting within the surrounding flange 5. The upper ends of the vertical members 10 are curved inwardly and welded or otherwise secured to a cap 12 which may be removably fitted down over the central stud 6 which projects upwardly from the top of the reflector, and the cage may be secured in place by application and tightening of the nut as shown. A suitable portion of the cage, preferably the portion midway of the height thereof, is adapted to receive panels which bear any desired warning, signal, direction or other symbols or reading matter for traffic directing or other appropriate information purposes. As shown, the intermediate circumferential members 11 of the cage are provided, in the spaces between adjacent vertical members 10, with pairs of angle-irons 13 which are welded or otherwise secured to the members 11, these angle-irons being so mounted that their inner flanges 14 lie in a common vertical plane while the other flanges 15 of these angle-irons are turned forwardly beneath the upper circumferential member and above the adjacent circumferential member of the cage, and each pair of angle-irons is adapted to removably receive the upper and lower ends of a frame 16 which contains a panel 17, the upper and lower ends of each frame being secured removably to the respective angle irons by bolts 18 or other suitable means. When the spaces intervening the vertical members 10 of the cage are filled with these panels, a polygonal band will be formed which encircles the reflector intermediately of its height.

The reflector 2 comprises a support 19 which is preferably hollow to attain lightness in weight, and the exterior surface of this support is covered throughout its exposed area by a reflector 20 which may be composed of silvered or highly polished bright metal which is pressed or otherwise formed with diamond or other shaped impressions which provide multiple reflecting surfaces lying in various planes. If diamond shaped impressions are used, each impression will be provided with four reflecting surfaces all lying in different planes. The reflecting surface is generally circular in each cross section thereof taken transverse of its vertical axis, and is concave in an axial direction, the radius of its axial concavity determining the distance of a headlight or other source of light from the reflector at which the upper and lower ends as will as the center of the reflector will be in focus therewith.

The circular transverse cross section of the reflector enables it to reflect back to the eyes of the operator of an approaching vehicle light projected on to the reflector irrespective of the angle at which the vehicle approaches the device, and the multiple reflecting surfaces lying in various planes and which compose the reflector are brilliantly illuminated by the headlights of the vehicle so that the devise appears in the eyes of the operator thereof as a brightly illuminated column. This is especially so when the approaching vehicle reaches the point where its headlights are at the focal point of the axial curvature of the reflector. The axial curvature of the reflector also causes the device to be brilliantly illuminated in the eyes of the operator of a vehicle approaching the device when the same is placed at the top or the bottom of a hill, as the light beams from the headlights of such vehicle will be at an efficient angle of reflection to the lower concave portion of the reflector when the device is located at the bottom of a hill and the vehicle is descending such hill and such light beams will strike the upper concave portion of the reflector at an efficient angle of reflection when the device is placed at the top of a hill and the automobile is ascending the hill. The convexity of the reflector in transverse planes will cause the light beams from the headlights of a vehicle approaching the device from one angle to impinge upon and be reflected from the sides of the reflector at various other angles, and these reflected rays will inform operators of vehicles on intersecting highways of the approach of other vehicles to an intersection at which the device may be placed. The top of the reflector is preferably formed with a rounded or substantially hemispherical dome 21 which may have a reflecting surface thereon like that on the sides of the reflector, this convex top acting to reflect beams of light from street lights or other sources of light above the device in directions which will reveal the presence of the device to the operators of unlighted vehicles and pedestrians. The base section 1 is also preferably provided exteriorly with a reflector 22 which preferably embodies multiple reflecting surfaces like those forming the sides of the reflector, and the base section is preferably circular but tapered axially so that it increases in diameter toward its lower end, this approximately conical formation of the reflector on the base section presenting this reflector so that it will efficiently reflect light rays projected on to it from a higher level, as for example from the headlights of motor vehicles in close proximity to it.

The panels 17 which are adapted to bear the warning or other signals, traffic directions or the like are composed of glass or other light transmitting material and are preferably colored appropriately according to the use to which the device is applied, red being appropriate for example in marking highway intersections or danger points and amber for marking safety zones or other places where caution is to be indicated.

Each panel, as shown in Figs. 6 to 9 inclusive, has preferably a smooth or plane front face and a prismatic rear face, the latter face being opposite to and spaced outwardly a suitable distance from the surface of the reflector 20 to be in focus with it or to effectively receive light rays reflected back to it from the reflector. The prismatic face may be formed in different ways, it being composed in Fig. 7 of a number of continuous horizontally elongated prisms 23 which are arranged in parallelism and one above and immediately next to the other throughout the height of the panel, or as shown in Fig. 8 wherein 17$^a$ represents one corner of a panel, the rear face of the panel may be formed with vertical and horizontal rows of flat sided prisms 24 which are in the form of pyramids which are distributed uniformly throughout the width and height of the panel. The panel 17$^c$ shown in Fig. 9 has its rear face formed with vertical and horizontal rows of conical portions or projections 25 which extend throughout the width and the height of the panel.

Fig. 6 shows diagrammatically the action of the light rays when projected on to one of the panels and the reflector behind it from the headlights of an automobile or from any other source when a panel such as that shown in Fig. 7 is used. The prisms refract or diffuse some of the light rays penetrating the panel in upward directions so that they strike the reflector 20, as is indicated by the dot-and-dash lines, while other rays penetrating the panel will be refracted or diffused downwardly so that they strike the reflector 20 as is indicated by the dotted lines, the light penetrating the panel being colored according to the color of the glass or other medium composing the panel and the light being spread over a relatively large area of the reflector and moreover the light rays strike the multiple surfaces of the reflector at various angles. Some of the light rays which pass through the panel will strike the portions of the reflector above and below the panel and such light will be reflected back to the operator of the vehicle or to the vicinity of the source of light, and the light thus reflected will be of the same color as that of the panel. Most of the light passing through the panel to the reflector however will be reflected from the multiple reflecting surfaces of the reflector back to the panel and will highly illuminate the rear side of the panel and will make the panel appear in the eyes of the operator of the approaching vehicle to glow brilliantly and in the same color as that of the panel. The glow thus produced will be visible to the operator of the approaching vehicle for a considerable distance, due to the brilliancy of the glow and to the lens effect of the prisms. The portions of the reflector 20 above and below the panels will reflect light from the headlights of the approaching vehicle so that these portions of the device will appear to be brilliantly illuminated to their full width, thus giving to the device the appearance of a luminous column or post, assuming the device occupies its normal upright position. If the device occupies a horizontal or other position, it will be rendered luminous in substantially the same manner as has been described so that the presence of the device will be clearly discernible. The substantially circular form of the reflector in a tranverse direction enables light rays from the headlights from an approaching vehicle to be reflected back to the operator thereof, at any angle from which the vehicle may approach the device, as the impinging rays from the headlights will always strike some of the multiple reflecting surfaces so that they will be reflected back to the panel or to the operator of the vehicle.

In using the form of panel shown in Fig. 8, the prisms 24 at the rear side thereof will act to refract or diffuse the light penetrating the panel in directions both vertically and horizontally so that the light from the panel will be diffused in both of these directions over the reflector, and the reflection of the light rays from the reflector back to the prisms on the rear face of the panel will produce a high illumination and the glowing effect described above with respect to the form of panel shown in Fig. 7, and the pyramids will act as lenses to project the light back from the device to a relatively great distance. In using a panel having conical projections 25 on its rear face as shown in Fig. 9, the diffusion or spreading of the light from the panel on to the reflector takes place in all directions about the axis of the cones and the luminous effect and the projection of the light to a great distance from the device are attained, substantially as has been described in connection with Fig. 8.

The forward or outer face of each panel may be plain or some of the panels may bear any appropriate warning or signal device or symbol or traffic direction or other markings or symbols or some of the panels may bear information or other reading matter. For example in Fig. 3 one of the panels bears the name of a destination point as indicated at 26 while other panels bear direction indicating arrows 27. These markings may be applied to the panels in any suitable way, the markings for example being composed of glass or other transparent or substantially transparent material which may be tinted with a color which will be distinguishable from the color of the panels, the glass elements composing the markings being for example inlaid and fused or cemented in the outer faces of the respective panels.

One or more of the panels may be composed of a glass or plate $17^d$ which may be either clear or colored and formed centrally or at some other portion thereof with a jewel 28 which is composed of glass or other light transmitting material which is convex at its outer or front face and concave at its inner or rear face, the outer and inner faces having numerous plane surfaces 29 which form lenses or facets which will diffuse light from approaching headlights over the multisurface reflector behind the jewel and will receive light reflected back from the reflector and will project it back from the device for a relatively great distance, and the facets will act as lenses to concentrate and intensify the reflected light.

When the device is employed as a warning or other signal and is constructed with a central reflector and suitably colored panels arranged transversely thereof substantially as hereinbefore shown and described, the device is rendered clearly visible to the operator of a motor vehicle approaching the device and his attention is called to the presence of the device and its significance by the brilliant glow of a panel or panels and the luminous appearance of the reflector above and below the panel, produced by the projection of light thereon from the headlights of such approaching vehicle.

The axially concave form of the reflector intensifies the luminous appearance of the reflector, especially when the headlights of an approaching vehicle reach a point substantially in focus therewith, and this concave form of the reflector renders it highly luminous to the operator of a vehicle ascending or descending a hill when the device is placed at the top or bottom of the hill, as the curvature of the deflector will compensate for the upward or downward slant of the headlight rays which strike the reflector and will insure efficient reflection of the light therefrom back to the eyes of the operator of the vehicle.

The luminous glow of the appropriately colored panels not only renders the device visible but it also illuminates such warning, directional or signal indications, symbols or other markings that may be applied to the panels so that they may be easily seen and read or interpreted by the vehicle operator.

When used as a signal or traffic directing or controlling means at the intersection of highways, the base of the device is preferably rounded and weighted so that the device will tend to stand normally in upright position but will yield if collided with by a vehicle, and return automatically to normal upright position, but if the device should lie in a reclining position, it will be rendered luminous and clearly visible to the operator of an approaching vehicle by the light rays from the headlights of such vehicle and hence the device will still perform its intended function.

In using the device as a caution or warning signal to protect safety zones or to warn vehicle operators of dangerous points along highways, the device may be mounted on a post and the post may have the reflector applied over its exterior face, the light reflected back to the operator of an approaching vehicle from the headlights of such vehicle warning the operator of the presence of the post.

It will be understood, of course, that the invention may be used not only in conjunction with motor vehicle traffic for direction, control or safety purposes but may be used advantageously for other similar purposes as for example, for marking or indicating the location of an aviation field and outlining the edges or limits thereof to an aviator when landing at night, in which case the device may be rendered luminous by light beams projected onto by a light or lights carried by the aircraft, or from any other suitable source.

While the panels will project light rays back to great distances when the light beams from headlights strike the panels at substantially right angles to their planes, substantial reflection will be obtained from the panels when the light rays strike them from either side and such light rays will also be reflected directly from the reflector, so that the device may be clearly seen by motor vehicle operators when it is placed alongside a highway as a danger or warning signal.

I claim as my invention:—

1. A light reflecting device of the class described comprising an upright column-like reflector embodying multiple reflecting surfaces arranged at different relative angles and a band of colored prismatic light transmitting and diffusing panels extending circumferentially around and spaced radially from said reflector between its ends.

2. A light reflecting device of the class described comprising a column-like reflector element, a base supporting the reflector element, a cage surrounding the reflector and resting on the base, and a band of light diffusing panels carried by the cage and surrounding the reflector between its upper and lower ends.

3. A light reflecting device of the class described comprising a base, a column-like reflector element resting thereon, means for removably securing the reflector element to the base, a skeleton-like cage surrounding the reflector element and resting on the base, and means for removably securing the cage at its top to the top of the reflector element and for holding the lower portion of the cage in position on the base.

4. A light reflecting device of the class described comprising a column-like reflector, and a cage arranged exteriorly thereof, the cage embodying intersecting rods forming open spaces between them, and an annular series of light diffusing panels mounted in some of said spaces.

In testimony whereof I have hereunto set my hand.

CLARENCE GARFIELD McLEAN.